US006813666B2

United States Patent
Joffrain

(10) Patent No.: US 6,813,666 B2
(45) Date of Patent: Nov. 2, 2004

(54) SCALEABLE ARBITRATION AND PRIORITIZATION OF MULTIPLE INTERRUPTS

(75) Inventor: Christian P. Joffrain, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 497 days.

(21) Appl. No.: 09/780,720

(22) Filed: Feb. 12, 2001

(65) Prior Publication Data

US 2002/0112107 A1 Aug. 15, 2002

(51) Int. Cl.[7] .............................................. G06F 13/00
(52) U.S. Cl. ..................................... 710/264; 710/262
(58) Field of Search ............................... 710/262, 265, 710/260, 264, 266

(56) References Cited

U.S. PATENT DOCUMENTS

| | | | | |
|---|---|---|---|---|
| 4,914,580 A | * | 4/1990 | Jensen et al. | ............... 710/265 |
| 5,659,759 A | * | 8/1997 | Yamada | ....................... 710/265 |
| 5,701,495 A | * | 12/1997 | Arndt et al. | .................. 710/263 |
| 5,758,169 A | * | 5/1998 | Nizar et al. | .................. 710/266 |
| 5,811,706 A | * | 9/1998 | Van Buskirk et al. | ........ 84/604 |
| 6,081,867 A | * | 6/2000 | Cox | ........................... 710/264 |
| 6,401,154 B1 | * | 6/2002 | Chiu et al. | ................... 710/260 |

OTHER PUBLICATIONS

"Integrated Hardware/Software Interrupt Controller", IBM Technical Disclosure Bulletin, vol. 31, No. 10, Mar. 1989, pp. 437 444.*

* cited by examiner

Primary Examiner—Glenn A. Auve

(57) ABSTRACT

A system operable to perform scaleable arbitration and prioritization of multiple interrupts. The present invention presents a solution that is theoretically indefinitely scaleable to accommodate any number of interrupt sources. The invention provides for orthogonal scalability of interrupt sources—a feature absolutely non-existent in the prior art. The propagation time of an interrupt within the system is predictable and nearly independent of the number of priority levels or the number of interrupt sources. In addition, the invention presents a novel solution to support multiple interrupt sources having a common priority level. The solution is scaleable in two dimensions, namely, modularity in the number of interrupt sources that can be supported and scaleable in the number of priority levels that can be supported. The solution significantly reduces the deleterious effects of hardware latency in slowing interrupt processing.

13 Claims, 5 Drawing Sheets

SCALEABLE ARBITRATION AND PRIORITIZATION OF MULTIPLE INTERRUPTS

FIELD OF THE INVENTION

The present invention relates generally to interrupt control; and, more particularly, it relates to scaleable interrupt control circuitry that performs arbitration and prioritization of any number of interrupt sources.

RELATED ART

Many conventional computing systems necessarily need to accommodate increasing numbers of interrupt requests as such computing systems continue to grow in size and complexity. The conventional computing systems that perform arbitration and prioritization of these interrupt requests are commonly not expandable to include larger numbers of interrupt requests. That is to say, to accommodate larger numbers of interrupt requests for a given architecture, a real estate-design of the architecture is often necessitated as the traditional architectures cannot easily include larger numbers of sources. A re-design of the architecture of the circuitry is necessarily performed each time the number of sources feeding the interrupt circuitry changes. This inability for expansion presents many undesirable features. For example, whenever a system is being considered for re-design and the number of sources that perform interrupt changes (either increases or decreases), then there necessarily needs to be a re-design not only of the system itself, but also of the interrupt control circuitry. This is expensive in terms of engineer design time, and it substantially lengthens the turn-around time that is required to get a newly designed system to fabrication.

Another problem that arises in the design of interrupt circuitry is the calculation and control of propagation time through the arbitration logic circuitry. Not only can there be significant design time associated with simply accommodating varying numbers of interrupt sources, but there is necessarily a characterization and modeling challenge in accommodating the new number of interrupt sources as the propagation time required by the arbitration logic circuitry will intrinsically be modified as well. As traditional interrupt technology commonly employs a single gate for each interrupt source, when there is an increase in the number of interrupts, there will subsequently be an increase in the number of gates in the system given the one-to-one relationship between interrupt source and gate. It necessarily follows that there will similarly be an increase in the propagation time through the system, specifically through the arbitration logic circuitry.

Moreover, even conventional interrupt processing circuitry causes reprogrammable prioritization problems when the number of interrupt sources changes. For example, a number of clock cycles are typically required to perform the reprogramming of the prioritization when there has been a modification in the number of interrupt sources within conventional systems. Oftentimes, this relatively slow reprogramming prohibits the use of systems requiring a large number of interrupt sources in certain applications where speed of operation is an important design criterion. As many embedded applications are increasing the number of interrupt sources from the historical number of 32 to 64, there is great difficulty in accommodating this increased number across a broad range of products and product lines without expending significant amounts of time and energy in performing re-design of the interrupt control circuitry and its associated arbitration logic circuitry.

Further limitations and disadvantages of conventional and traditional systems will become apparent to one of skill in the art through comparison of such systems with the present invention as set forth in the remainder of the present application with reference to the drawings.

BRIEF DESCRIPTION OF THE INVENTION

A better understanding of the present invention can be obtained when the following detailed description of various exemplary embodiments are considered in conjunction with the following drawings.

DETAILED DESCRIPTION OF THE INVENTION

The invention provides a solution to ease the design of an interrupt controller to accommodate an indefinite number of interrupts. The present solution is scaleable, and provides for dynamic prioritization between the interrupts. Design time is significantly reduced, as the need to perform a complete re-design of the interrupt control circuitry each and every time the number of interrupts changes within a system is completely obviated. If desired, software or hardware is employed to accommodate the instance when multiple interrupt sources have a common interrupt level. The invention presents a novel solution to arbitrate, prioritize, and respond to an indefinite number of interrupts. The inherent scaleable nature of the present solution lends itself readily to modularity, in that, blocks of interrupt processing circuitry is easily combined together. The present invention presents a solution that is operable in any number of devices that must perform interrupt processing, including but not limited to, wireless communication circuitry, automotive applications, personal computing (PC), stand alone devices, and main frame computing systems. Moreover, the present invention presents a solution that is easily amenable to embedded applications that are increasing the number of interrupts sources from the previously conventional number of 32 to the new number of 64, borrowing on the very easily scaleable nature of the invention. The present solution is indefinitely scaleable to accommodate any new number of interrupt sources.

The present invention presents a solution that is theoretically indefinitely scaleable to accommodate any number of interrupt sources. The invention provides for orthogonal scalability of interrupt sources—a feature absolutely non-existent in the prior art. The propagation time of an interrupt within the system is predictable and nearly independent of the number of priority levels or the number of interrupt sources. In addition, the invention presents a novel solution to support multiple interrupt sources having a common priority level. The solution is scaleable in two dimensions, namely, modularity in the number of interrupt sources that can be supported and scaleable in the number of priority levels that can be supported. The solution significantly reduces the deleterious effects of hardware latency in slowing interrupt processing.

Figure 1:
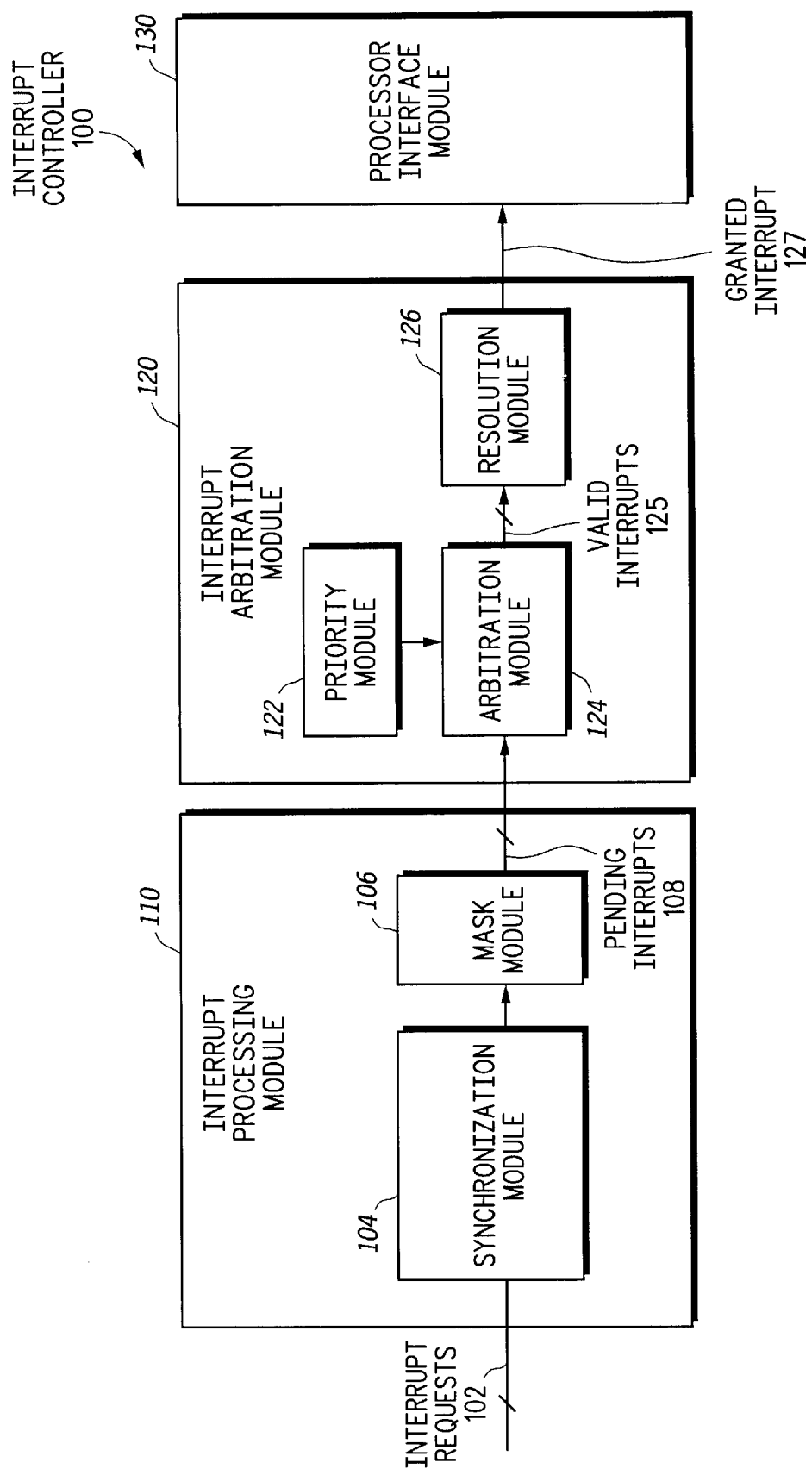
FIG. 1 is a system diagram illustrating one embodiment of an interrupt controller built in accordance with one embodiment of the present invention.

FIG. 1 is a system diagram illustrating one embodiment of an interrupt controller 100 built in accordance the present invention. The interrupt controller 105 itself contains, among other things, an interrupt processing module 110, an interrupt arbitration module 120, and a processor interface module 130. The interrupt processing module itself contains, among other things, a synchronization module 104 and a mask module 106. The interrupt arbitration module itself contains, among other things, a priority module 122, an arbitration module 124, and a resolution module.

An indefinite number of interrupt requests 102 are provided to the interrupt processing module 110. Within the interrupt processing module 110, the synchronization module first receives the indefinite number of interrupt requests 102 wherein the interrupts themselves are acknowledged. Subsequently, after the processing on the interrupt requests 102 by the synchronization module 104, the indefinite number of interrupt requests 102 are fed to the mask module 106 within the interrupt processing module 110 where masking of the indefinite number of interrupt requests 102 is performed. During masking, those interrupts having certain priority levels are "masked" by a pending interrupt request until cleared. From certain perspectives, these interrupts having certain priority levels are viewed as being a sub-set of the indefinite number of interrupt requests 102. If desired, the size of the sub-set as well as the particular interrupts within the indefinite number of interrupt requests 102 that will be masked are both controllable. In some instances, the control is based on an operating condition or a system condition of the interrupt controller 100 itself. Moreover, the control may be based on an operating condition of the interrupt processing module 110. Generically, the number of interrupts requests that are masked may be defined by any parameter within the interrupt controller 100, by user-definition. In one situation, one of the interrupt requests is masked for a predetermined period of time.

In addition, it is possible to write dynamically a higher priority number to that masked interrupt. After the indefinite number of interrupt requests 102 have been masked within the masking module 106, the interrupt controller 100 then deals with the indefinite number of interrupt requests 102 as an indefinite number of pending interrupts 108. The indefinite number of pending interrupts 108 are then passed to the interrupt arbitration module 120 where the priority level, among other things, of the indefinite number of pending interrupts 108 is arbitrated.

The arbitration module 124 within the interrupt arbitration module 120 first receives the indefinite number of pending interrupts 108. There, the pending interrupts within the indefinite number of pending interrupts 108 having the highest priority are selected. The priority module 122 employs priority registers, in certain embodiments of the invention as will be shown below, to assist in the prioritization of the indefinite number of pending interrupts 108.

For example, the priority registers within the priority module 122 are operable to indicate the type of interrupt, i.e., fast/normal, system/user, etc. in accordance with the present invention. A most significant bit (MSB) may be used to distinguish between two complete sets of interrupts. For example, the MSB may be used to distinguish between system based interrupts and user based interrupts.

It is noted that the priority levels make requests independent from the hardware wiring within the interrupt controller 100. In addition, the priority module 122 and the arbitration module 124 are operable to accommodate cooperatively several interrupt sources having the same priority level. Theoretically, there is no limitation as to the number of interrupt sources having a common priority level that can be shared. The resolution module 126 is operable to ensure that, after the arbitration among all of the pending interrupts 108 has been performed, only one of the interrupts is actually active at any onetime as determined by the hardware ranking within the resolution module 126. A granted interrupt 127 is then that one interrupt within the indefinite number of pending interrupts 108. The processor interface module 130 then performs the necessary processing on the granted interrupt 127 to interface into whatever hardware circuitry the interrupt controller 100 has been installed.

Figure 2:
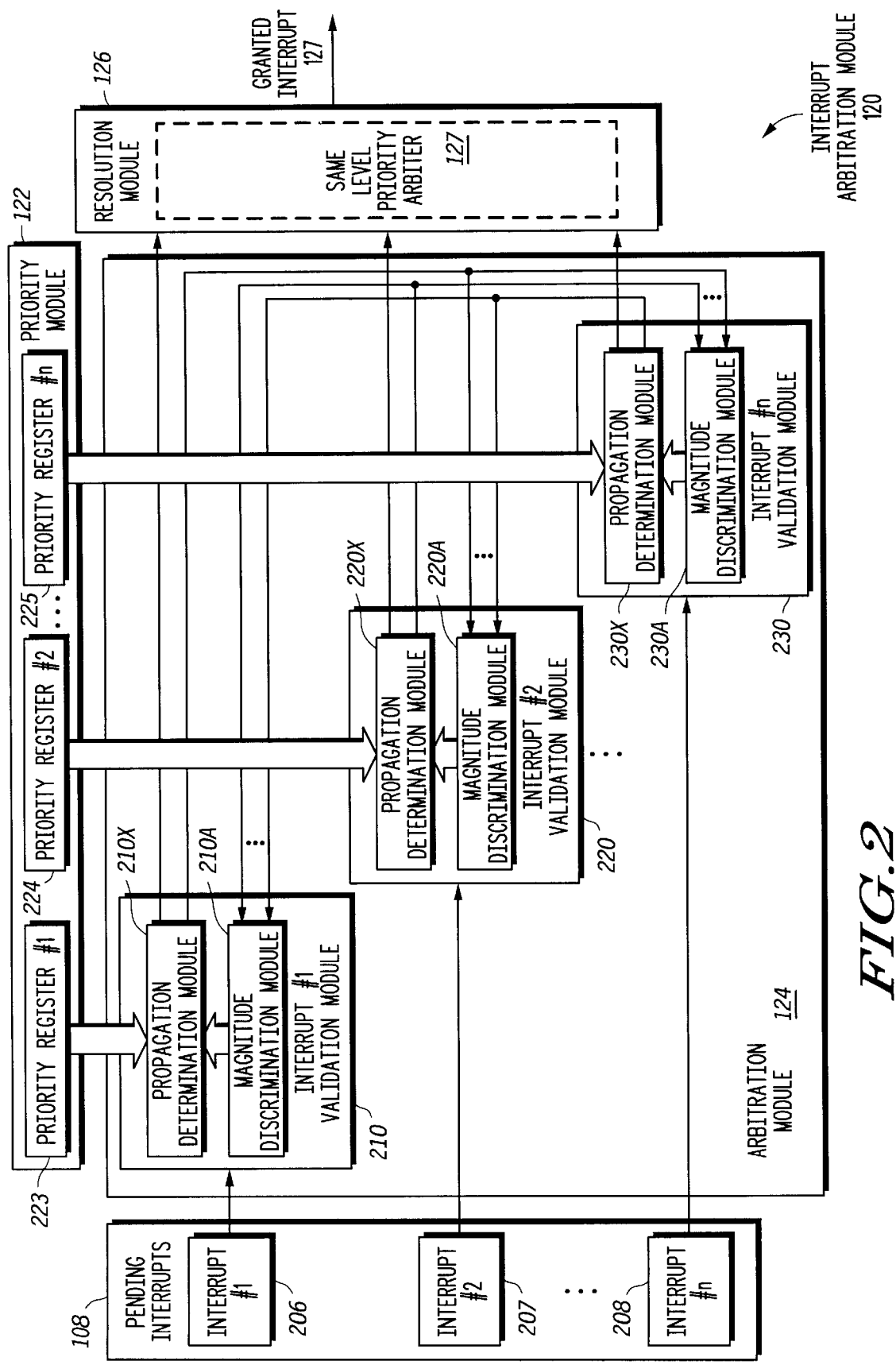
FIG. 2 is a system diagram illustrating one specific embodiment of an interrupt arbitration module built in accordance with the interrupt controller of FIG. 1.

FIG. 2 is a system diagram illustrating one specific embodiment of an interrupt arbitration module 120 built in accordance with the interrupt controller 100 of FIG. 1. An indefinite number of pending interrupts 108 is provided to the arbitration module 124. The indefinite number of pending interrupts 108 are illustrated by an interrupt #1 206, an interrupt #2 207, and an interrupt #n 208 separated by an ellipsis. A priority module 122 as shown in FIG. 2 is shown to contain a number of priority registers as shown by a priority register #1 223, a priority register #2 224, and a priority register #n 225 separated by an ellipsis. An arbitration module 124 is shown to contain an indefinite number of validation modules to accommodate the indefinite number of pending interrupts 108.

Specifically, the arbitration module 124 contains an interrupt #1 validation module 210, an interrupt #2 validation module 220, and an interrupt #n validation module 230. Each of the validation modules 210, 220, and 230 contains, among other things, a propagation determination module and magnitude determination module. For example, the interrupt #1 validation module 210 itself contains, among other things, a magnitude discrimination module 210A and a propagation determination module 210X. The interrupt #2 validation module 220 itself contains, among other things, a magnitude discrimination module 220A and a propagation determination module 220X; the interrupt #n validation module 230 itself contains, among other things, a magnitude discrimination module 230A and a propagation determination module 230X.

From each of the validation modules 210, 220, and 230, one of the priority register #1 223, the priority register #2 224, and the priority register #n 225 within the priority module 122 is provided a priority level that is used by the propagation determination modules 210X, 220X, and 230X. There is one output from each one of the propagation determination module 210X, the propagation determination module 220X, and the propagation determination module 230X that is fed directly to a resolution module 126. In addition, another output from each of the propagation determination module 210X, the propagation determination module 220X, and the propagation determination module 230X is communicatively coupled to each of the magnitude discrimination modules 210A, 220A, and 230X. For example, the one output from the propagation determination module 210X within the interrupt #1 validation module 210 is communicatively coupled to the magnitude discrimination module 220A within the interrupt #2 validation module 220 and to the magnitude discrimination module 230A within the interrupt #n validation module 230. Similarly, the one output from the propagation determination module 220X within the interrupt #2 validation module 220 is communicatively coupled to the magnitude discrimination module 210A within the interrupt #1 validation module 210 and to the magnitude discrimination module 230A within the interrupt #n validation module 230; the one output from the propagation determination module 230X within the interrupt #n validation module 230 is communicatively coupled to the magnitude discrimination module 210A within the interrupt #1 validation module 210 and to the magnitude discrimination module 220A within the interrupt #2 validation module 220; and so on.

Therefore, each of the magnitude discrimination module 210A, the magnitude discrimination module 220A, and the magnitude discrimination module 230A receives an indefinite number of inputs that is, in certain embodiments of the invention, one less than the total number of the indefinite number of pending interrupts 108 and the total number of priority levels within the priority module 122. However, it is noted that the total number of the indefinite number of pending interrupts 108 and the total number of priority levels within the priority module 122 need not necessarily be the same. For example, a smaller number of priorities that indefinite number of pending interrupts 108 exists in certain embodiments of the invention.

In one embodiment of the invention to be discussed more in detail later, to add to the indefinite number of pending interrupts 108, a new cell is added, whereas to add a new number of interrupt priorities, a new gate is added within the interrupt arbitration module 120. In the representation of FIG. 2, to accommodate an increase in the total number of interrupts, the vertical dimension of the interrupt arbitration module 120 is scaled accordingly. For example, to add an additional interrupt to be accommodated, an additional row is added. Similarly, to accommodate an increase in the total number of levels of interrupts, the horizontal dimension of the interrupt arbitration module 120 is scaled accordingly. For example, to double the total number of levels that may be accommodated, an additional column is added. In general, the number of interrupt sources is scaled in the vertical direction, whereas the priority levels are scaled in the horizontal direction.

However, this vertical and horizontal illustration is exemplary to show the scalability of the present invention to accommodate any indefinite number of interrupts and any indefinite number of interrupt levels. The vertical and horizontal designations are arbitrary, and may be transposed in a particular implementation, depending on the layout of the architecture. The total number of interrupts and the total number of interrupt levels need not be equal. For example, some of the interrupts may have a common interrupt level. The present invention is operable to accommodate any arbitration between interrupts having a common interrupt level.

From certain perspectives, the operation of the magnitude discrimination module 210A, the magnitude discrimination module 220A, and the magnitude discrimination module 230A is that arbitration which is performed among the bits of the priority register #1 223, the priority register #2 224, and the priority register #n 225 as viewed from a column perspective in view of the embodiment of the interrupt arbitration module 120 within FIG. 2. For example, the priority among a specific column is determined using the magnitude discrimination module 210A, the magnitude discrimination module 220A, and the magnitude discrimination module 230A. In comparison, operation of the propagation determination module 210X, the propagation determination module 220X, and the propagation determination module 230X is viewed as being that which maintains the propagation through the remainder of the circuitry while continuing the previous stage's arbitration. For example, the propagation determination module 220X will maintain the arbitration of the previous stage, namely, the propagation determination module 210X, and so on throughout the remainder of the arbitration module 124.

After all of the priority levels corresponding to each of the indefinite number of pending interrupts 108 have passed through the arbitration module 124, they are fed to a resolution module 126. Within the resolution module, those of the indefinite number of pending interrupts 108 that have been prioritized with a "same" level of priority are resolved using a "same level" priority arbiter 127 so that only a granted interrupt 127 remains. In certain embodiments of the invention, the "same level" priority arbiter 127 is performed using hardware priority resolution.

Figure 3:
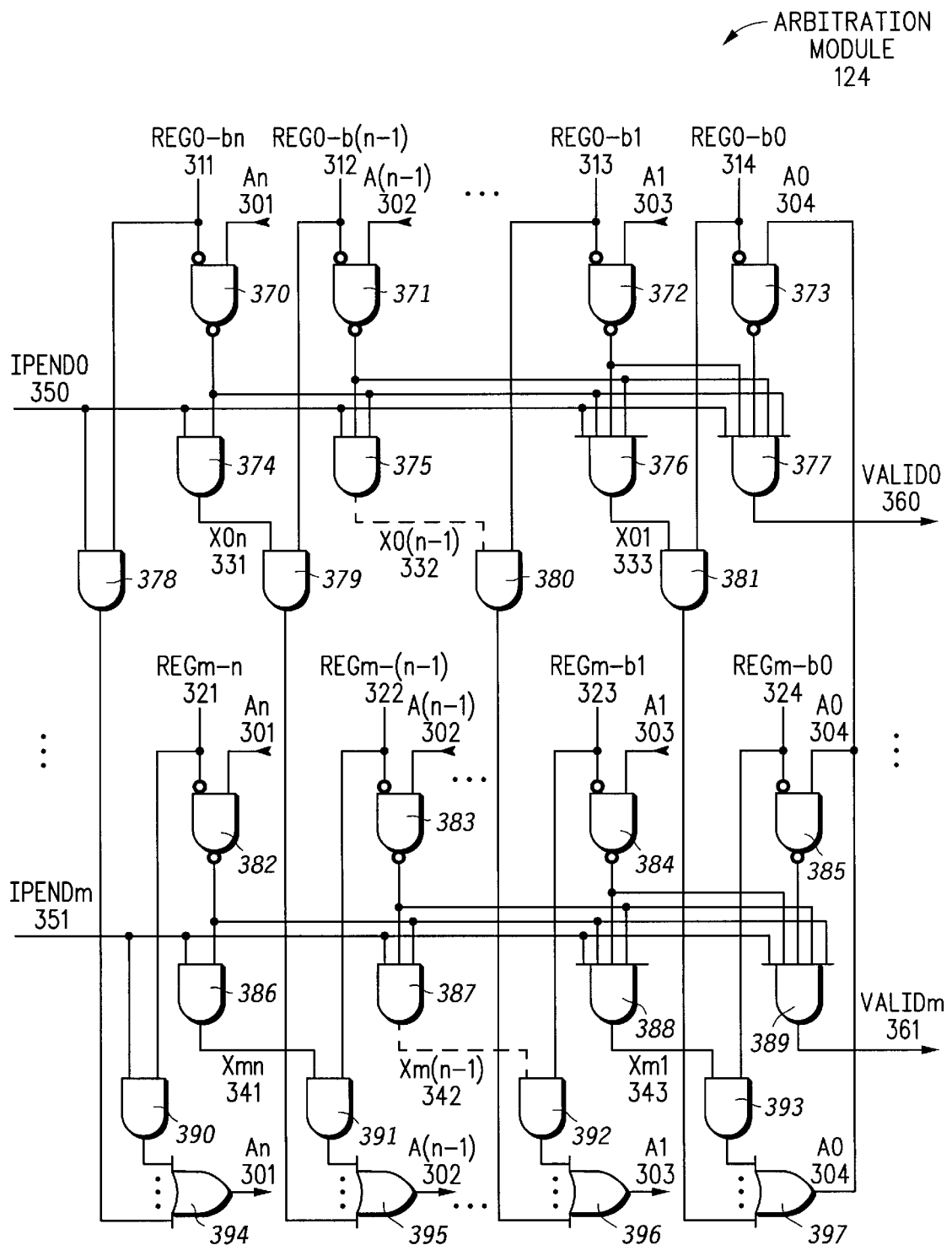
FIG. 3 is a system diagram illustrating one specific embodiment of an interrupt module built in accordance with the interrupt controller of FIG. 1.

FIG. 3 is a system diagram illustrating one specific embodiment of an interrupt module 124 built in accordance with the interrupt controller 100 of FIG. 1. As shown in the other embodiments of the invention, an indefinite number of pending interrupts are operable within the present invention, as shown by a pending interrupt signal (IPEND0) 350 and a pending interrupt signal (IPENDm) 351 separated by an ellipsis. A number of register priority bits are used to provide the functionality of a priority module in this embodiment of the invention. The register priority bits, which are stored in priority registers in certain embodiments of the invention, are shown as a register priority bit Reg0-bn 311, a register priority bit Reg0-b(n−1) 312, a register priority bit Reg0-b1 313, a register priority bit Reg0-b0 314, a register priority bit Regm-n 321, a register priority bit Regm-b(n−1) 322, a register priority bit Regm-b1 323, and a register priority bit Regm-b0 324. The register priority bits are fed into various logic circuitry as shown in FIG. 3.

Specifically, the register priority bit Reg0-bn 311 is fed into the a logic circuitry 370 and a logic circuitry 378. The register priority bit Reg0-b(n−1) 312 is fed into a logic circuitry 302 and a logic circuitry 379. The register priority bit Reg0-b1 313 is fed into a logic circuitry 303 and a logic circuitry 380. The register priority bit Reg0-b0 314 is fed into a logic circuitry 373 and a logic circuitry 381. The register priority bit Regm-n 321 is fed into a logic circuitry 382 and a logic circuitry 390. The register priority bit Regm-b(n−1) 322 is fed into a logic circuitry 383 and a logic circuitry 391. The register priority bit Regm-b1 323 is fed into a logic circuitry 384 and a logic circuitry 392. Finally, the register priority bit Regm-b0 324 is fed into a logic circuitry 385 and a logic circuitry 393.

In addition, the indefinite number of pending interrupts, shown as the pending interrupt signal (IPEND0) 350 and the pending interrupt signal (IPENDm) 351 separated by the ellipsis, are fed into the arbitration module 124. Specifically, the pending interrupt signal (IPEND0) 350 is provided to the logic circuitry 378, a logic circuitry 374, a logic circuitry 375, a logic circuitry 376, and a logic circuitry 377. Similarly, the pending interrupt signal (IPENDm) 351 is provided to a logic circuitry 386, a logic circuitry 387, a logic circuitry 388, and a logic circuitry 389.

Certain of the register priority bits and the pending interrupts combine within various circuitry to generate intermediary signals that are used subsequently to generate arbitration signals. For example, the pending interrupt signal (IPEND0) 350 and the register priority bit Reg0-bn 311 combine within the logic circuitry 378 to generate an output signal that is fed into a logic circuitry 394 to generate an arbitration signal An 301. The arbitration signal An 301, emitting from the logic circuitry 394, is then fed back into the logic circuitry 370 in conjunction with the register priority bit Reg0-bn 311. Similarly, the arbitration signal An 301, emitting from the logic circuitry 394, is then fed back into the logic circuitry 382 in conjunction with the register priority bit register priority bit Regm-n 321.

The output from the logic circuitry 370 is fed into the logic circuitry 374 to generate an output being a propagation signal X0n 331. The propagation signal X0n 331 is then combined with the register priority bit Reg0-b(n−1) 312 within the logic circuitry 379 to an intermediary signal that is fed into a logic circuitry 395. The output from the logic circuitry 395 is an arbitration signal A(n−1) 302. The arbitration signal A(n−1) 302, emitting from the logic circuitry 395, is then fed back into the logic circuitry 371 in conjunction with the register priority bit Reg0-b(n−1) 312 being fed into the logic circuitry 371.

The other interconnections of the various circuitries within FIG. 3 are clear from the system diagram. For example, the output from a logic circuitry 396 serves as an arbitration signal A1 303; the output from a logic circuitry 397 serves as an arbitration signal A0 304. Moreover, the output of the logic circuitry 375 serves as a propagation signal X0(n−1) 332; the output of the logic circuitry 376 serves as a propagation signal X01 333; the output of the logic circuitry 386 serves as a propagation signal Xmn 341; the output of the logic circuitry 387 serves as a propagation signal Xm(n−1) 342; and the output of the logic circuitry 388 serves as a propagation signal Xm1 343.

Finally, the arbitration of the indefinite number of pending interrupts, shown as the pending interrupt signal (IPEND0) 350 and the pending interrupt signal (IPENDm) 351, is completed and the indefinite number of pending interrupts are validated and prioritized, shown as a valid interrupt signal (VALID0) 360 and a valid interrupt signal (VALIDm) 361 separated by an ellipsis. The valid interrupt signal (VALID0) 360 and the valid interrupt signal (VALIDm) 361 separated by the ellipsis are then provided to a resolution module, such as the resolution module 126. In the event of any common priority between the valid interrupt signal (VALID0) 360 and the valid interrupt signal (VALIDm) 361 separated by the ellipsis, then a hardware "same level" priority arbiter, such as the "same level" priority arbiter 127, is used to "break the tie" or prioritization.

From certain perspectives of the invention, the logic circuitries 370, 371, 372, 373, 374, 375, 376, 377, 382, 383, 384, 385, 386, 387, 388, and 389 are all cooperatively operable to perform propagation determination. In addition, from certain perspectives of the invention, the logic circuitries 378, 379, 380, 381, 390, 391, 392, 393, 394, 395, 396, and 397 are all cooperatively operable to perform magnitude discrimination. Certain of the logic circuitries described above are AND gates, NAND gates, and OR gates as known in the art of logic circuitry. Certain of the inputs and outputs of the various logic circuitries are INVERTED as also known in the art of logic circuitry. A person having ordinary skill in the art of logic circuitry design will readily recognize the specific configuration of each of the logic circuitries and the INVERTED on NON-INVERTED nature of the interconnectivity as illustrated in FIG. 3.

The scalability of the arbitration module 124 is described as follows. To be able to accommodate adding one more register priority bit, a "column" of circuitry must be added to accommodate the register priority bit. For example, the register priority bit Reg0-b0 314 is accommodated by the logic circuitries 373, 377, 381, 385, 389, 393, and 397. To accommodate an additional register priority bit, a logic circuitry structure similar to the logic structure represented by the logic circuitries 373, 377, 381, 385, 389, 393, and 397 is simply duplicated and added on the right hand side of FIG. 3.

Similarly, to be able to accommodate adding one more interrupt source, a "row" of circuitry must be added to accommodate the interrupt source. For example, the pending interrupt signal (IPENDm) 351 is accommodated by the logic circuitries 382, 383, 384, 385, 386, 387, 388, 389, 389, 390, 391, 392, and 393. To accommodate an additional interrupt source, a logic circuitry structure similar to the logic structure represented by the logic circuitries 382, 383, 384, 385, 386, 387, 388, 389, 389, 390, 391, 392, and 393 is added just below the bottom side of FIG. 3.

The OR gates 394, 395, 396, and 397 are pushed down, and each of the OR gates receives an additional input in a manner similar to how the gate 394 receives inputs from the AND gates 390 . . . 378. To add an additional interrupt source, one more input, provided from an AND gate is fed to each of the OR gates 394, 395, 396, and 397. The present invention employs a design that is scalable across the arbitration module 124 to accommodate an indefinite number of interrupt sources. The indefinite size representation of the arbitration module 124 in FIG. 3 shows the ability of the present invention to scale and accommodate any number of interrupt sources and interrupt levels. As mentioned elsewhere, the total number of interrupt sources and the total number of interrupt levels need not coincide. They are the same in some embodiments, and they are different in others. Some interrupt sources may share a common interrupt level.

Figure 4A:
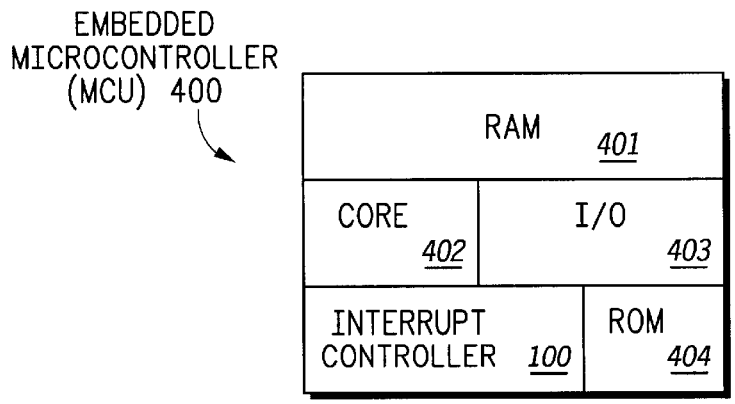
FIG. 4A is a system diagram illustrating an embedded micro-controller having an interrupt controller built in accordance with one embodiment of the present invention.

FIG. 4A is a system diagram illustrating an embedded micro-controller (MCU) 400 having an interrupt controller 100 built in accordance with the present invention. The embedded micro-controller (MCU) 400 itself contains, among other things, a random access memory (RAM) block 401, a processing core 402, an input/output (I/O) module 403, and a read access memory (ROM) block 404. The embedded micro-controller (MCU) 400 illustrates one embodiment of the invention wherein the interrupt controller 100 is contained within an embedded device.

Figure 4B:
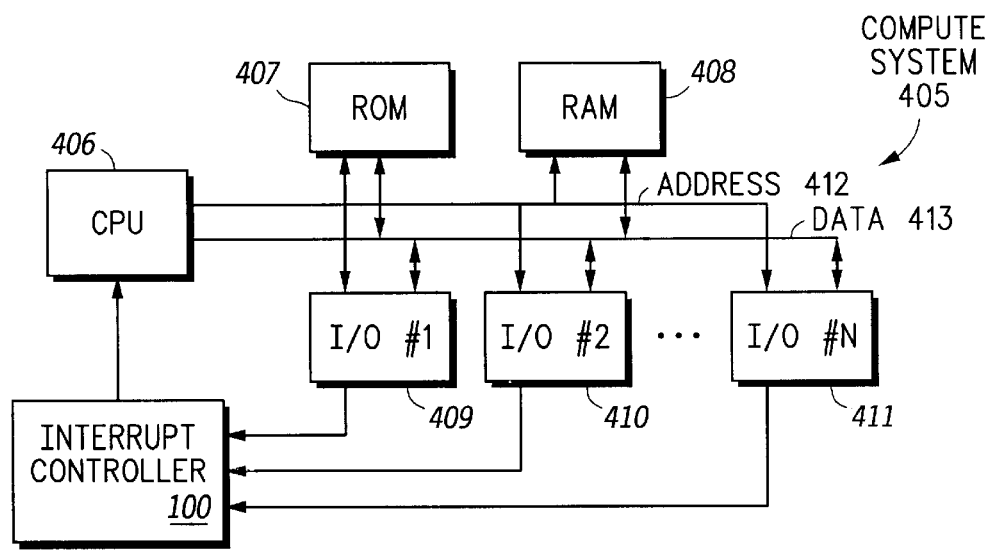
FIG. 4B is a system diagram illustrating a compute system having an interrupt controller built in accordance with one embodiment of the present invention.

FIG. 4B is a system diagram illustrating a compute system 405 having an interrupt controller 100 built in accordance with the present invention. The compute system itself contains, among other things, a central processing unit (CPU) 406, a random access memory (RAM) block 407, a read access memory (ROM) block 408, an indefinite number of input/output (I/O) modules illustrated by an input/output (I/O) #1 module 409, an input/output (I/O) #2 module 410, and an input/output (I/O) #n module 411 separated by an ellipsis, the interrupt controller 100, and address lines 412 and data lines 413 across which the various pieces of the compute system 405 communicate. The compute system 405 illustrates one embodiment of the invention wherein the interrupt controller 100 is contained within a compute system.

Figure 4C:
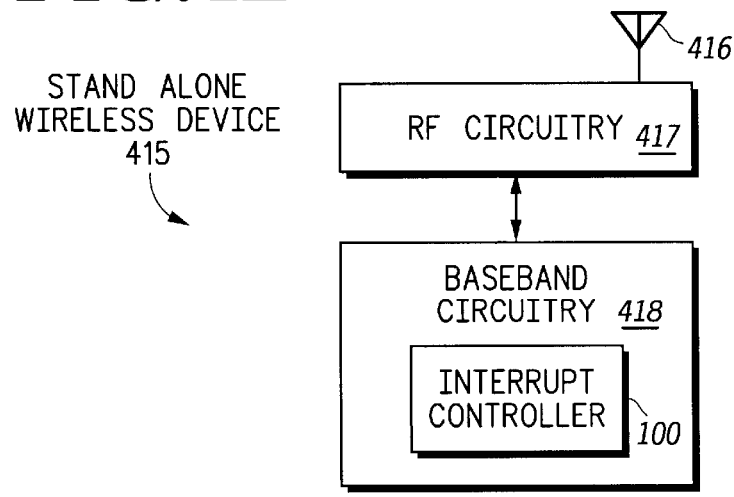
FIG. 4C is a system diagram illustrating a stand-alone wireless device having an interrupt controller built in accordance with one embodiment of the present invention.

FIG. 4C is a system diagram illustrating a stand-alone wireless device 415 having an interrupt controller 100 built in accordance with the present invention. The standalone wireless device 415 itself contains, among other things, an antenna 416, a radio frequency (RF) circuitry 417, and a baseband circuitry 418 containing the interrupt controller 100. The stand-alone wireless device 415 illustrates one embodiment of the invention wherein the interrupt controller 100 is contained within a stand-alone wireless device.

Other systems that employ interrupt controller circuitry in any fashion are equally amenable to incorporation of the interrupt controller 100. The embedded micro-controller (MCU) 400 of FIG. 4A, the compute system 405 of FIG. 4B, and the standalone wireless device 415 of FIG. 4C are all merely illustrative of the adaptability of the interrupt controller 100 to be incorporated into many different and various application specific devices.

Figure 5:
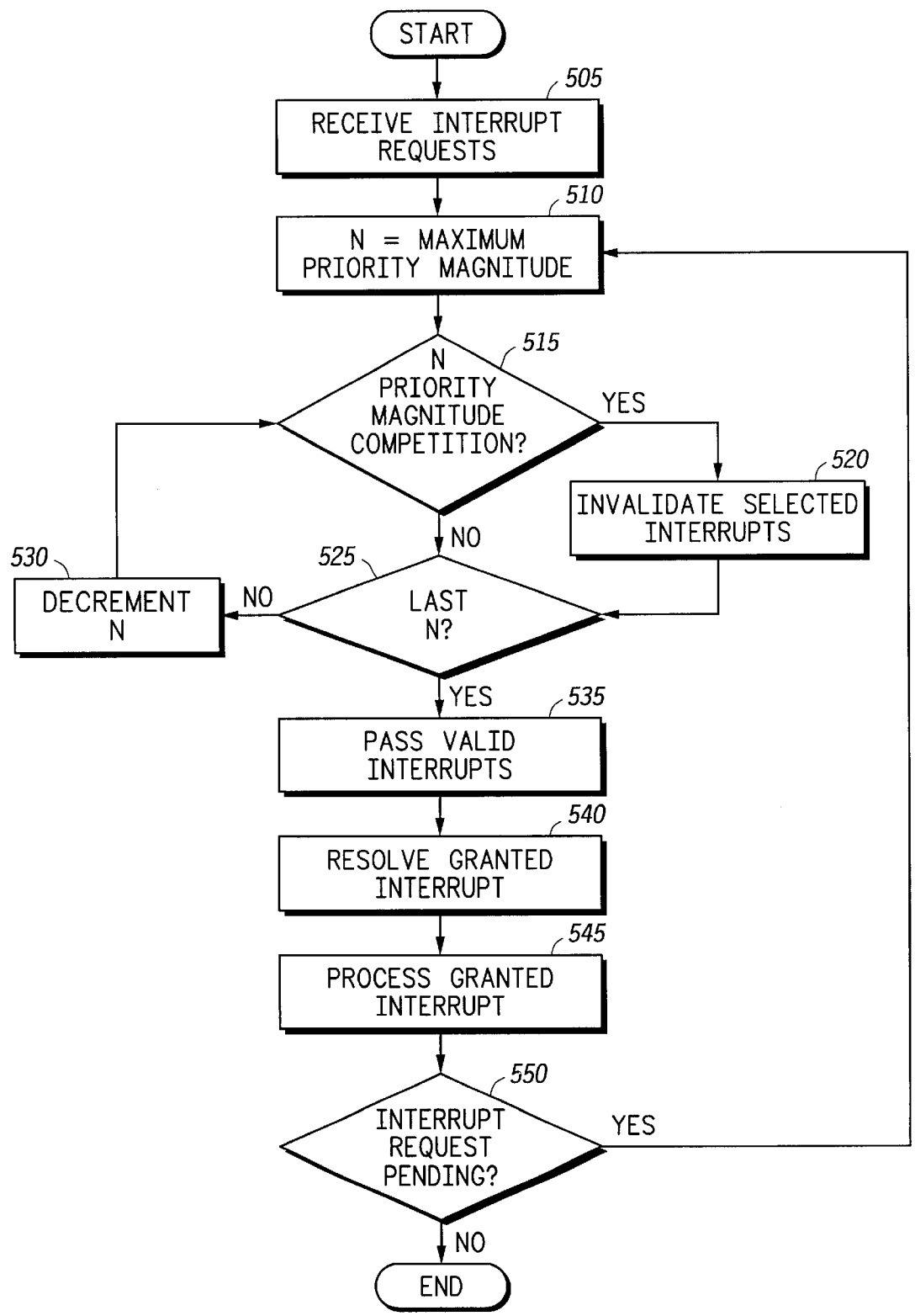
FIG. 5 is a functional block diagram illustrating a method that performs interrupt processing in accordance with one embodiment of the present invention.

FIG. 5 is a functional block diagram illustrating a method 500 that performs interrupt processing in accordance with the present invention. In a block 505, a plurality of interrupt requests is received. Subsequently, in a block 510, a maximum priority magnitude (N) is accessed. In a decision block 515, it is determined if there exists a priority magnitude competition. If there does in fact exist a priority magnitude competition, as decided in the decision block 515, a selected number of interrupts are invalidated in a block 520. Conversely, if there does not exist a priority magnitude competition, as decided in the decision block 515, it is further determined in a decision block 525 whether the priority magnitude is the last priority magnitude within the method 500. If the priority magnitude, as identified in the decision block 515, is not the last priority magnitude within the method 500, then the priority magnitude is decremented in a block 530. Conversely, if the priority magnitude, as identified in the decision block 515, is in fact the last priority magnitude within the method 500, then the method 500 continues and passes a plurality of valid interrupts in a block 535.

Subsequently, in a block 540, a granted interrupt is resolved from among the plurality of valid interrupts in the block 535. The granted interrupt is then processed in a block 545. Finally, in a decision block 550, it is determined if there are any additional interrupt requests pending within the method 500. If there are in fact any additional interrupt requests pending within the method 500, as determined within the decision block 550, then the method 500 returns to the block 510 to determine the priority magnitude of the pending interrupt request. Conversely, if it is determined within the decision block 550 that there are no pending interrupt requests, then the method 500 terminates.

In view of the above detailed description of the present invention and associated drawings, other modifications and variations will now become apparent to those skilled in the art. It should also be apparent that such other modifications and variations may be effected without departing from the spirit and scope of the present invention.

What is claimed is:

1. An interrupt controller offering orthogonal scalability of a plurality of interrupt requests for use by a processor, the interrupt controller comprising:
   an interrupt processing module that performs interrupt masking to a sub-set of interrupt requests within the plurality of interrupt requests;
   an interrupt arbitration module that assigns a priority level to each of the plurality interrupt requests within the plurality of interrupt requests, the priority level being programmable; and
   a processor interface module that transforms at least one of the plurality of interrupt requests for use by the processor, the at least one of the plurality of interrupt requests has a highest priority level,
   wherein the interrupt arbitration module comprises a plurality of interrupt validation modules, each of the plurality of interrupt validation modules performs magnitude discrimination and propagation determination cooperatively with the other of the plurality of interrupt validation modules.

2. The interrupt controller of claim 1, wherein the interrupt arbitration module comprises a priority module that is operable to perform dynamic programming of the priority level.

3. The interrupt controller of claim 1, wherein the priority level assigned by the interrupt arbitration module to each of the plurality of interrupt requests is performed dynamically.

4. The interrupt controller of claim 1, wherein each of the plurality of interrupt requests has a different priority level.

5. The interrupt controller of claim 1, wherein at least two of the plurality of interrupt requests have a common priority level.

6. The interrupt controller of claim 5, wherein the processor interface module further comprises a same level priority arbiter that selects one of the at least two of the plurality of interrupt requests that have the common priority level.

7. The interrupt controller of claim 1, wherein the interrupt controller is contained within a computer system.

8. The interrupt controller of claim 1, wherein the interrupt controller is contained within a stand alone device.

9. The interrupt controller of claim 1, wherein the interrupt controller is contained within an embedded device.

10. An interrupt controller offering orthogonal scalability of a plurality of interrupt requests for use by a processor, the interrupt controller comprising:
    an interrupt processing module that performs interrupt masking to a sub-set of interrupt requests within the plurality of interrupt requests;
    an interrupt arbitration module that assigns a priority level to each of the plurality interrupt requests within the plurality of interrupt requests, the priority level being programmable; and
    a processor interface module that transforms at least one of the plurality of interrupt requests for use by the processor, the at least one of the plurality of interrupt requests has a highest priority level,
    wherein one of the plurality of interrupt requests is masked for a predetermined period of time.

11. A method to perform interrupt control, the method comprising:
    receiving a plurality of interrupt requests;
    dynamically programming a priority level corresponding to at least one of the plurality of interrupt requests;
    arbitrating the priority level for the at least one of the plurality of interrupt requests;
    validating the at least one of the plurality of interrupt requests when the at least one of the plurality of interrupt requests has a highest priority level; and
    resolving a priority dispute between the at least one of the plurality of interrupt requests and at least one additional one of the plurality of interrupt requests when the at least one of the plurality of interrupt requests and the at least one additional one of the plurality of interrupt requests have a common priority level,
    wherein the arbitration of the priority level for the at least one of the plurality of interrupt requests further comprises:

determining a first propagation signal at a first stage;

determining a second propagation signal at a second stage using the first propagation signal; and discriminating a magnitude for the priority level for the at least one of the plurality of interrupt requests to generate an arbitration signal.

12. The method of claim 11, wherein the method is performed within a stand alone wireless device.

13. The method of claim 11, wherein the method is performed using an embedded processor.

* * * * *